United States Patent [19]
Barrett

[11] 3,721,579
[45] March 20, 1973

[54] METHODS FOR PRODUCING PLASTIC COMPOSITE MATERIALS

[75] Inventor: Lawrence G. Barrett, Lynchburg, Va.

[73] Assignee: The American Novawood Corporation, Lynchburg, Va.

[22] Filed: Nov. 20, 1970

[21] Appl. No.: 91,381

Related U.S. Application Data

[63] Continuation-in-part of Ser. No. 678,584, Oct. 27, 1967.

[52] U.S. Cl. .............117/93.31, 117/148, 118/620, 250/52, 250/106 R
[51] Int. Cl. .............................................B44d 1/50
[58] Field of Search ..........117/93.31, 148; 118/620; 250/52, 106 R

[56] References Cited

UNITED STATES PATENTS

| 2,963,747 | 12/1960 | Brown | 117/93.31 |
| 3,214,582 | 10/1965 | Jefferson | 250/52 |
| 3,420,761 | 1/1969 | Feibush | 117/93.31 X |

*Primary Examiner*—Alfred L. Leavitt
*Assistant Examiner*—J. H. Newsome
*Attorney*—Burns, Doane, Swecker & Mathis

[57] ABSTRACT

Methods and apparatus are provided for converting a base material such as paper, wood or concrete to a plastic composite material in which the steps of pressure impregnation of the base material with a monomer and polymerization of the monomer after impregnation by irradiation is accomplished in a single container. The apparatus includes an irradiation tank equipped with an irradiation absorbing fluid recirculation system for bacteria control and an inert gas system for displacing the irradiation absorbing fluid from between the submerged containers and the irradiation source. The methods described include placing a first canister containing composite material impregnated with a liquid monomer within radiation receiving proximity to the radiation source, irradiating through walls of the canister the impregnated material in the canister by an amount sufficient to effect partial polymerization of the monomer without raising the temperature to a disadvantageous level, and after partial polymerization of the monomer in the first canister, placing a second canister containing the material impregnated with a liquid monomer between the first canister and the radiation source whereby substantially only radiation passing through the second canister effects complete polymerization of the monomer in the first canister without further materially raising the temperature of the composite material therein.

10 Claims, 10 Drawing Figures

INVENTOR
LAWRENCE G. BARRETT

BY Burns, Doane, Swecker & Mathis

ATTORNEYS

INVENTOR
LAWRENCE G. BARRETT

METHODS FOR PRODUCING PLASTIC COMPOSITE MATERIALS

CROSS REFERENCE TO RELATED APPLICATION

This application is a continuation-in-part of copending application, Ser. No. 678,584, filed Oct. 27, 1967.

BACKGROUND OF THE INVENTION

1. Field of the Invention

This invention relates to methods and apparatus for manufacturing plastic composites.

2. Summary of the Prior Art

The basic process of manufacturing wood-plastic composites is well known. It involves the steps of impregnating the wood with a liquid monomer and curing to effect the polymerization of the impregnated monomer either by irradiating the impregnated wood with gamma rays or by the use of heat. The characteristics of the resulting product may be controlled by varying the amount and depth of monomer impregnation into the wood, the type of monomer, the viscosity of the impregnating monomer which is varied through the addition of prepolymerized polymer, the inclusion of additives tending to improve selected characteristics such as fire retardancy, fungus resistance, heat distortion temperature and chemical resistance, and the technique for polymerization, e.g., radiation or heat curing.

The first of these steps, the impregnation of the wood with the monomer, has heretofore been carried out by techniques well known and used in the treatment of wood with preservatives and fire retardants. The impregnation step is desirably accomplished under positive pressure to facilitate the loading of the wood with the liquid monomer. By adjustment of the time and amount of pressure used in the impregnation step and the entrapment of an inert gas within the wood, the loading and the distribution of the monomer within the wood can be controlled.

The second step, that of irradiating the monomer impregnated wood to effect polymerization thereof, must also be carried out in a vapor tight container as the vapor pressure of the monomer is quite high and a substantial monomer loss would be incurred during the irradiation period to the detriment of the desired loading parameters. Vaporization of the monomer would also expose the operating personnel to a significant health hazard as the fumes are quite toxic. The vapor is also inflammable and the evaporation thereof creates a further hazard in the form of potentially explosive atmosphere. Additionally, the use of an inert gas during the polymerization process to prevent oxygen inhibition has been found extremely desirable.

The walls of the irradiation vessels are desirably constructed of low density materials of a minimum thickness to minimize the parasitic absorption of the curing radiation energy such as gamma rays. Further, in order to obtain a high efficiency of radioactive source utilization, the geometry of the irradiation vessel should substantially conform to the geometry of the product. The practical design considerations for radioactive source elements also lead to planar source construction. This stems from the need of encapsulation of the basic radioactive source materials, efficient production of the radioactive source materials in nuclear reactors, and the need for remote assembly of the source elements into composite source assemblies.

Typically, the temperature to which the polymerizable monomer compound is heated by irradiation to effect polymerization is within the range of from 10° C. to 100C°., and at any event, should be below the temperature at which the base material is harmed, which in the case of wood is the vaporization temperature of moisture within the wood. Vaporization of the moisture within the wood can cause swelling and discoloration of the wood product resulting in a distorted and degraded wood-plastic composite. Placing the material to be irradiated in the radiation receiving proximity of the radiation source which results in the most efficient utilization of the source causes vaporization of moisture within the wood to occur before complete polymerization of the monomer. If the material to be irradiated is moved away from the radiation source, a longer time is required to effect the conversion of the monomer to a polymer and the cost of manufacture is therefore increased.

SUMMARY OF THE INVENTION

Accordingly, a primary object of the present invention is to provide novel methods and apparatus for producing plastic composites without incurring, or by substantially alleviating, the disadvantages of the prior art.

Still another major object is the provision of novel methods and apparatus for effecting polymerization of the monomer impregnated in the base materials by radiation from a source submerged in a pool of water thereby reducing the irradiation hazards to operating personnel. This apparatus and method involve unique container-handling equipment for subjecting the monomer impregnated material to irradiation that is substantially uniform in both duration and intensity.

Yet another object of the present invention is the provision of novel methods for effecting polymerization of the monomer impregnated in the wood without raising the temperature of the wood to the vaporization temperature moisture within the wood while achieving highly efficient utilization of the radiation source.

In accordance with one aspect of the present invention, an irradiation station is provided which includes a tank having a bottom and upstanding walls, means for filling the tank with a radiation absorbing fluid such as water, means for supporting a source of radiation within the radiation absorbing fluid, means for lowering a canister containing material to be irradiated into the fluid and into radiation receiving proximity of the radiation source, and means for raising and removing the canister after the irradiation treatment has been completed.

In another aspect of the present invention, the irradiation station further includes means for lowering a second canister or canisters containing material to be irradiated into the radiation absorbing fluid between the first lowered canister or canisters and the radiation source.

In another aspect of the present invention, an improved process is provided for the production of wood-plastic composite material, which process includes providing a source of high energy gamma radiation, placing a first canister or canisters containing wood impregnated with a liquid monomer within radiation receiving proximity to the radiation source, irradiating through walls of the canister the impregnated wood in the canister by an amount sufficient to effect partial polymerization of the monomer without raising the temperature of the wood up to the vaporization temperature of moisture within the wood, and after partial polymerization of the monomer of the first canister or canisters, placing a second canister or canisters containing wood impregnated with a liquid monomer between the first canister and the radiation source whereby substantially only radiation passing through the second canister effects complete polymerization of the monomer in the first canister without raising the temperature of the wood therein to the moisture vaporization temperature.

The essence of this aspect of the invention is the discovery that the radiation passing through the second canister can effect complete polymerization of the monomer in the first canister without raising the temperature of the wood therein to the moisture vaporization temperature. This discovery allows the capacity or efficiency of the utilization of the radiation source to be increased up to double its original capacity or efficiency without incurring the problems associated with vaporization of the moisture within the wood.

Other objects, aspects, and advantages of the present invention will become apparent from the claims and from the following description of the preferred embodiments when read in conjunction with the appended drawings.

DESCRIPTION OF THE PREFERRED EMBODIMENTS

Figure 1:
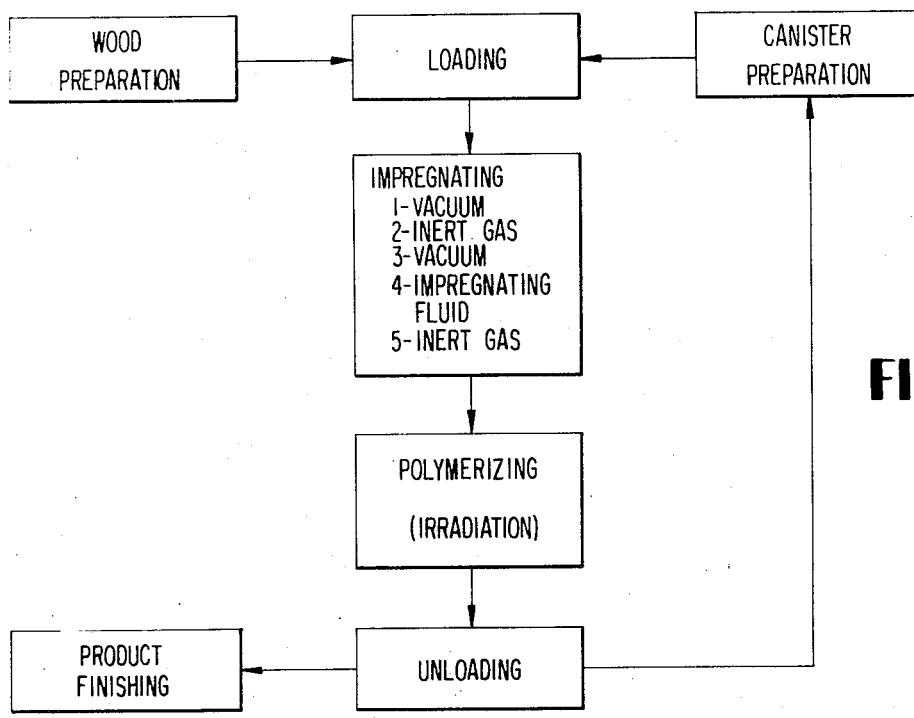
FIG. 1 is a flow chart illustrating the basic conversion process.

One embodiment of the system of the present invention is illustrated by the flow chart of FIG. 1. Wood from a convenient storage area is prepared, e.g., by sawing or other machining to size, for loading into canisters which have been cleaned from previous operations. Once the canister has been loaded with the wood to be converted to a wood-plastic composite, the canister is sealed and transported to the impregnation station. At the impregnation station, air is evacuated from within the canister and to some extent from the void spaces between the fibers within the wood. The resulting vacuum is then released by an inert gas such as nitrogen. The inert gas is in turn evacuated from within the canister and an impregnating monomer, such as methyl-methacrylate, together with a catalyst, if desired, is pumped into the canister for positive pressure impregnation by the fluid into the body of the wood. After a sufficient time has elapsed to allow the desired degree of impregnation, the excess fluid, that is, the fluid unabsorbed by the wood, is drained from the canister under a cover of the inert gas.

After impregnation of the wood, the canister is transported to the conversion station where the monomer is polymerized as by irradiation with gamma rays. After the polymerization of the fluid monomer within the wood, which converts the wood to a wood-plastic composite, the canister is transported to the unloading station where the wood-plastic composite is removed for further processing, such as sanding and polishing, as may be desired. Any polymerized excess monomer remaining in the canister is removed and the canister is otherwise cleaned and prepared for reuse.

Figure 2:
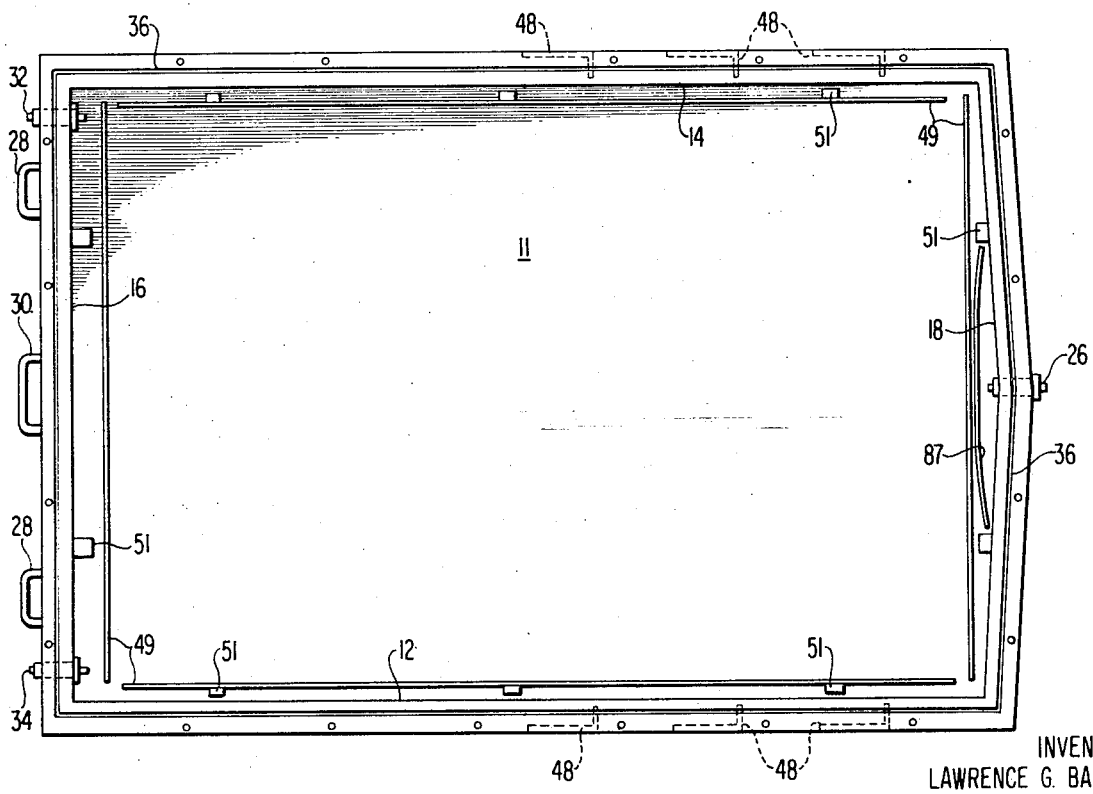
FIG. 2 is a plan view of the novel canister of the instant invention with the top removed.
Figure 3:
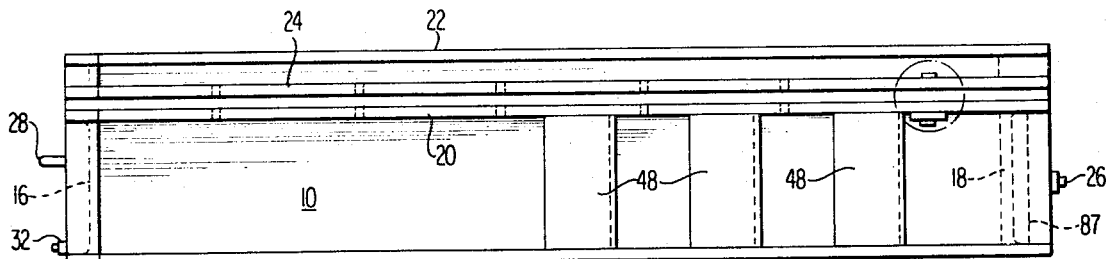
FIG. 3 is a side view of the canister of FIG. 2.
Figure 4:
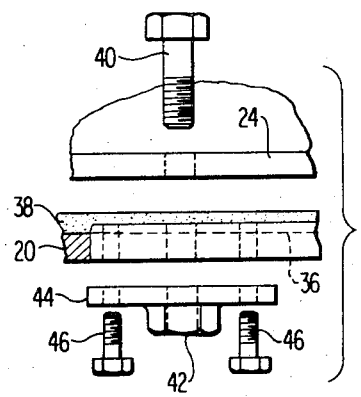
FIG. 4 is an exploded view showing the details of the means encircled in FIG. 3 for fastening the top to the canister.

Referring now to FIGS. 2, 3, and 4 for the details of canister construction, the main body 10 is illustrated to have a generally rectangular box-like configuration. Bottom 11 is thin and flat. Side walls 12 and 14 and end walls 16 and 18 are comparatively thick and rigid, and terminate at the upper end in a flange 20. Top 22 is similarly constructed having side and end walls of a depth sufficient only to provide a flange 24 which mates with the flange 20 of the side walls 12 and 14 and end walls 16 and 18 around the entire periphery of the canister. Although the canister 10 may be of any convenient size, internal dimensions of slightly more than 4 feet by 8 feet, e.g., 50 inches by 100 inches, have been found to be desirable to accommodate commercially available wood products. Canister depth requirements are dictated in part by gamma ray absorption and are generally between about 8 and 20 inches. In actual practice a 12 inch depth has been found especially advantageous.

End wall 16 may be equipped with handles or hooks 28 to which means for handling the canister may be attached. End wall 16 may also be equipped with a handle 30 which is particularly adapted for use in the hanging of the loaded canister in a radiation shielding medium during the irradiation polymerization process. Handles 28 and 30 may, of course, be combined into any single attachment means whereby the handling of the canister can be facilitated.

End wall 18, when the canister is hung by handles 28 and 30, becomes a bottom wall. It therefore is shaped at a point approximately midway the extremities thereof to form a very shallow V. An externally operated valve 26 may be inserted at the apex of the V to facilitate drainage of the canister.

Externally operated valves 32 and 34 may be located respectively immediately adjacent the side walls 12 and 14 at opposite ends of end wall 16. Their functions become evident in view of the impregnating step described below.

Since the canister must be air-tight, a seal is provided between main body 10 of the canister and the top member 22. A groove 36 may be cut into the upper surface of flange 20 to receive a gasket 38. Gasket 38 is generally tubular in cross-section and is of a substance not readily copolymerized such as neoprene. It has been found beneficial to coat the gasket 38 with a petroleum jelly such as Vasoline prior to each use of the canister 10. Gasket 38 will eventually harden or graft copolymerize with monomer under exposure to gamma rays and must be periodically inspected and replaced.

Complete separation of top member 22 from the main body 10 of the canister is desirable for ease of loading. Quick release mechanisms may be advantageously used to secure top 22 to main body 10, though mechanisms having a tendency to corrode or otherwise become inoperable when submerged in water should be avoided. A satisfactory fastener may consist of threaded bolts 40 and nuts 42 secured on the lower side of flange 24 as shown in FIG. 4. Nuts 42 may be secured on the lower side of flange 24 as by plate 44 and screws 46 or by welding if desired.

Pockets 48 may be provided along the external side walls 12 and 14 of the canister 10 for the purpose of receiving weights to be added as necessary to assist in the submergence of the loaded canister within a radiation absorbing or shielding fluid in the irradiation conversion process and to compensate for shifts in the center of gravity which may accompany the uneven loading of the canister 10 with the wood to be converted.

The selection of a material out of which to construct the single, multifunction canister of the present invention is subjected by conflicting considerations. It is essential that the material be of sufficient strength to withstand high internal pressures during the time when the monomer impregnation takes place and external pressures when submerged; that it have high resistance to corrosion while submerged in a radiation absorbing medium such as water; and that it have low gamma ray absorption characteristics, meaning it should have a low density and be as thin as possible on the large area surfaces through which the radiation passes. Aluminum has been found to be the preferred material for the thin, flat radiation receiving surfaces of bottom 11 and top 12. The side walls may be of other materials, or made sufficiently strong by increasing the dimensions thereof.

Water is liberated from the wood during the conversion process. In those applications where the canister is submerged and hence cooled, the liberated water and some monomer have been observed to collect upon the internal wall surfaces of the canister 10.

Contact of the product with water results in discoloration. To reduce or prevent discoloration, a liner 49 of an insulative material such as cardboard may be inserted in the canister as illustrated in FIG. 2. Liner 49 is spaced slightly from the internal walls as by small blocks 51. Water and monomer collecting on the internal surfaces of the canister 10 behind the liner 49 drain downwardly to collect in the slight V in the end wall 18. The polymer may be removed from the canister 10 after the canister is removed from the polymerization station.

Once the canister has been loaded with wood to be converted and the top secured thereto, the loaded canister is transported by any convenient means such as an overhead rail and trolley system to the impregnation station. There it is placed in the impregnation apparatus. At the impregnation apparatus, the air therein is evacuated from the canister by an evacuation pump and the resulting vacuum within the canister is thereafter released with an inert gas pumped therein.

The inert gas may be fully or partially evacuated from the canister by again connecting the evacuation pump. Monomer is then introduced into the canister. It has been found that the impregnation process is accelerated if the canister is entirely filled with monomer and pressurized by application of inert cover gas or compressed air up to about 150 lbs./in.$^2$, the optimum pressure depending upon the impregnating fluid viscosity and the porosity of the wood to be impregnated. Supplying the monomer at a pressure to about 40 lbs./in$^2$ is satisfactory for many applications.

Once sufficient time has elapsed for the wood within the canister to reach the desired state of impregnation, unabsorbed monomer is drained from the canister.

It is, of course, necessary to remove the unabsorbed monomer from within the canister prior to the polymerization thereof to prevent polymerization of the entire contents of the canister to a single, homogeneous mass. The monomer collected may be reused.

It is to be recognized that numerous variations in the process cycle are possible which will affect the concentration and distribution of monomer within the wood. The parameters having greatest effect are the degree of treating vacuum in the second vacuum stage, the inert gas pressure applied and its time duration after draining off the excess monomer, the soaking pressure and time and the viscosity of the impregnating fluid.

Variations are possible in the impregnation process to permit the attainment of uniform partial monomer loadings and also monomer loadings tending to localize the monomer near the surface. Such partial loadings, when achieved under controlled conditions, are of economic importance since they reduce the amount, and hence cost, of the monomer without reducing the desired properties of the finished product for many applications.

These variations are achieved by varying primarily the degree of the vacuum and the applied pressures. If a partial vacuum only is used just prior to the filling of the canister with the liquid monomer, thereafter when the pressure is applied the entrapped nitrogen in the wood parts will tend to hold back the monomer and create a higher concentration of monomer near the surface.

The impregnating apparatus may comprise a rigid frame of a generally box-like construction which may be any suitable structural material such as carbon steel.

In the actual impregnation operation it has been found convenient to place two or more canisters in side-by-side relationship, the adjacent tops and bottoms of the respective canisters providing mutual support for each other against expansion due to the internal impregnation pressures. Bottles or drums containing respectively a suitable impregnating fluid including monomer additives with or without catalyst and an inert gas such as nitrogen are provided in fluid communication with the canister.

After impregnation, provision may be made for tilting the canister to facilitate draining. The addition of an inert gas into the canister aids in the draining process by preventing the creation of a vacuum in the canister.

One important advantage of the present invention is that the wood is not handled after impregnation and prior to polymerization. Because many monomers are toxic, it is important for commercial operation that the canister configuration be adapted not only for the impregnation operation, but also for the polymerization operation.

The present invention will be specifically illustrated hereinafter with relation to the production of composites by polymerization of certain liquid polymerizable esters of alpha-substituted acrylic acid. Such esters polymerize rapidly to form hard polymers which are especially desirable. Hence, the invention is of particular importance in the utilization of these compounds. It is to be understood, however, that the invention is applicable generally to the polymerization of liquid polymerizable vinylidene compounds, that is, compounds containing the vinylidene,

structure; and that the esters of alpha-substituted acrylic acids comprise but one subgenus of vinylidene compounds.

Typical examples of esters of alpha-substituted acrylic acids which may be used include the following:
Methyl methacrylate
Ethyl ethacrylate
Butyl methacrylate
Isobutyl methacrylate
Secondary butyl methacrylate
Tertiary amyl methacrylate
Phenyl methacrylate
Glycol monomethacrylate
Glycol dimethacrylate
Cyclohexyl methacrylate
Para-cyclohexylphenyl methacrylate
Decahydro-beta-naphthol methacrylate
Di-isopropyl carbinol methacrylate
Furfuryl methacrylate
Methallyl methacrylate
Tetrahydrofurfuryl methacrylate
Methyl ethacrylate
Ethyl alpha-butyl acrylate
Ethyl alpha-chloro acrylate
Ethyl alpha-cyano acrylate
Methyl alpha-cyano acrylate
Methyl alpha-methoxy acrylate
Dimethyl itaconate (which may be called methyl alpha-carbomethoxy methyl acrylate)

It will be noted that the alpha-substituent in these esters may be an alkyl radical, a halogen atom, a cyano radical, an alkoxy radical, a substituted alkyl radical or the like.

Polymerizable vinyl compounds comprise another subgenus of polymerizable vinylidene compounds and may also be used in this invention, particularly those that polymerize to form hard resins such as styrene, mono and dichloro styrenes, p-methyl styrene, divinyl benzene, vinyl naphthalene, methyl vinyl ketone, glycol diacrylate, acrylonitrile, vinyl acetate, vinyl butyrate, etc.

Still other liquid polymerizable vinylidene compounds not falling within the above subclasses which may be used in this invention include alpha-methyl styrene, methacrylonitrile, vinylidene chloride, methyl isopropenyl ketone and the like. All of the above-mentioned polymerizable vinylidene compounds may be polymerized alone or mixtures of two or more such compounds may be polymerized to yield copolymers.

The temperature to which the polymerizable monomer compound is heated to effect polymerization will also vary depending on the particular monomers and catalysts used. Ordinarily, however, this temperature is within the range of 10° to 100°C, and in any event is below the boiling point of the monomer, and below the vaporization temperature of any moisture within the wood.

It has also been found advantageous to initiate polymerization by radiation, preferably with the use of free-radical catalysts. Here, as above, the preferred conditions for treatment will depend on the particular wood or wood product, the dimensions thereof, the type and degree of irradiation and, in some instances, other factors. After an immersion period, which may vary widely, e.g., from 1 to 60 hours, or more, depending upon the type of wood and the extent and amount of impregnation desired, the free monomer is drained from the canister. The impregnated cellulosic body is then exposed to ionizing radiation while maintaining the temperature of the body below 100°C. for a suitable period of time to bring about polymerization.

In selecting a suitable radiation source, high-energy particulate radiation or high-energy electromagnetic radiation is suitably employed. Thus, there may be employed beta particles, electrons, gamma rays, and X-rays, from artificial or natural radioactive isotopes. The selection of the radiation source will be governed by the dimensions of the body being treated. Good results have been obtained by irradiation from sources, such as a cobalt-60 source, producing radiation dose rates from 1.6 to 100 rads/sec, or higher.

Figure 5:
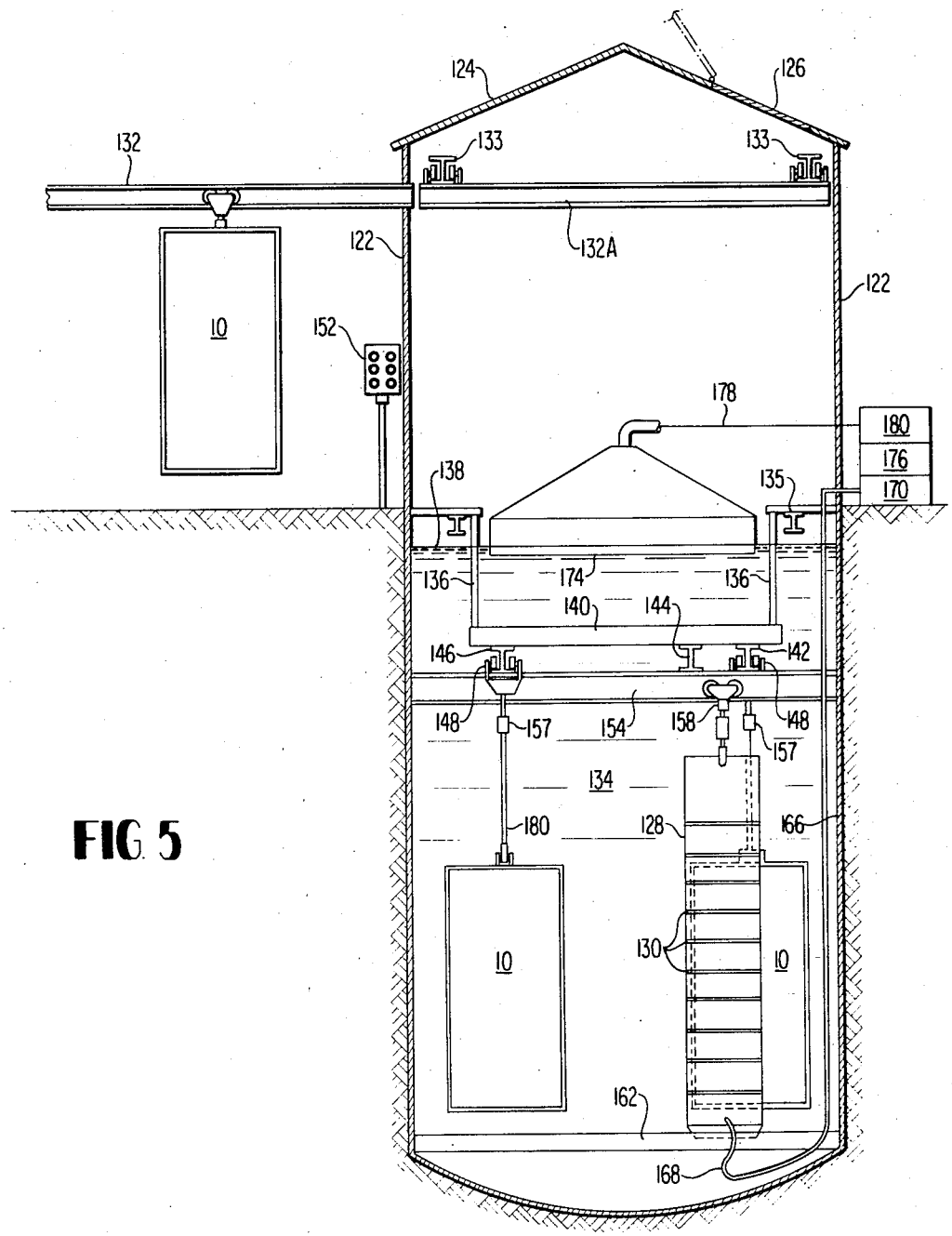
FIG. 5 is a schematic side view of the station where a source of radiation is submerged in a pool of water and the canisters loaded with monomer impregnated wood are lowered in radiation receiving proximity thereto to effect the curing or polymerization of the monomer.

The impregnated wood filled canisters 10 may be transported to an irradiation tank as by means of a conventional rail and trolley system shown schematically in FIG. 5 (not to scale). The tank itself may be of any configuration but it is here illustrated to have a generally cylindrical shape. In actual practice, the tank would have a larger diameter and an extended rail system so that the canisters 10 could be rotated without interfering with each other, or the plaque 128, hereinafter discussed. The irradiation station extends for some distance both above and below the surface on the earth in which it is placed. The upper portion 122 serves as a weather shield and is covered with a roof 124 having a closable opening 126 therein through which a lead transfer cask containing the individual source elements is lowered into the pool. The cask then can be safely unloaded under water and the source elements remotely handled and placed into the source plaque.

Source plaque 128 may be substantially flat and have a plurality of cobalt-60 slugs 130 at spaced intervals, e.g., discontinuous parallel rows, along the length thereof. The plaque 128 illustrated is slightly less than one-half the four foot width of the larger canisters and is sufficiently longer than the eight foot length of canister 10 to provide uniform exposure despite the end effects. Positioning the plaque 128 adjacent first one and then the other extreme edges of the canisters while maintaining the canisters stationary results in the exposure of the center section of the canister 10 to a reduced dosage but for a longer period of time, the time integral of the radiation received being determinative in the conversion.

An overhead mobile crane (not shown) for handling the cask (not shown) for the source elements 130 and a rail and trolley system 132A for removing the canisters 10 from the transportation rail 132 and for lowering them into the tank may be supported by rails 133 in the portion 122 of the irradiation station that extends above ground.

Figure 6:
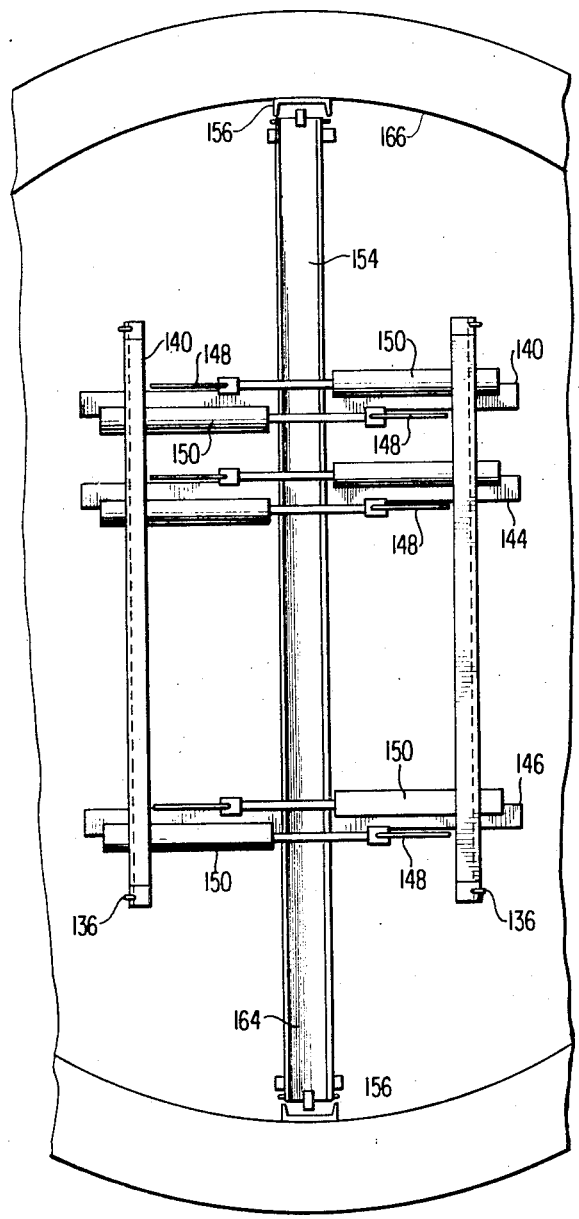
FIG. 6 is a plan view of the station shown in FIG. 5 to illustrate the rails for suspending the radiation source and canisters in the water pool.

The tank is filled to slightly below ground level with a radiation absorbing fluid 134 such as water. Suspended by channels 135 and rods 136 beneath the surface 138 of the fluid 134 is a rail and trolley array shown in greater detail in FIG. 6. The depth at which the array is suspended is material only to the extent that radiation hazards to operating personnel are eliminated at the surface 138 of the fluid 134.

Rigidly attached to the lower surface of a pair of spaced parallel supporting members 140 are three parallel canister rails 142, 144, and 146. Each canister rail is equipped with a pair of trolleys 148. Suitable pneumatic or hydraulic cylinders and pistons may be provided to independently position the trolleys 148, the means 152 for controlling the position of the trolleys 148 being remotely located above the surface 138 of the fluid 134.

The source plaque 128 is suspended from rail 154 by means of trolley 158 and a retractable piston 159. The lower end 160 of plaque 128 rides in guide 162 restricting movement back and forth along a single vertical plane. Guide 162 is of sufficient depth to allow approximately 6 inches vertical displacement of the plaque 128 as it is raised and lowered by piston 159 in irradiating the canisters 10.

The vertical movement of the source plaque 128 is desirable to smooth out variations in the radiation pattern which may result from the use of line sources 130.

The position of plaque 128 supporting trolley 158 along rail 154 and the position of piston 159 are preferably controlled remotely from a control station 152.

As earlier mentioned, the canisters 10 may conveniently be made in two sizes, the larger substantially twice the dimensions of the smaller. In the illustrated embodiment, only two of the larger canisters 10 may be simultaneously suspended from the array, one from each end of the center canister rail 144. Rail 144 is not centered with respect to the tank but is offset sufficiently so that it is centered with respect to the space remaining between the radially innermost end of the plaque 128 when positioned at the extreme end 164 of rail 154 and the opposite wall 166 of the tank. This allows the canisters 10 to be rotated by rotary actuators 157 so that opposite sides of the canisters, which have the thin, comparatively radiation transparent walls, can be sequentially exposed to the radiation plaque 128.

The lower end 160 of plaque 128 is of hollow construction, is apertured, and is in fluid communication as by way of flexible hose 168 with a source 170 of an inert, nonradiation absorbent gas such as nitrogen. A plenum chamber 172, the lower surface 174 of which is positioned slightly beneath the surface 138 of the radiation absorbing fluid 134, is used to collect water and the inert gas pumped under pressure by pump 176 from the source 170 to be released at the plaque 128. The mixture of inert gas and radiation absorbing fluid drawn from the plenum chamber 172 by means of line 178 and pump 176 is fed to a separator 180. The liquid from separator 180 may be returned to the tank after appropriate filtering. By introducing the recirculated water to pass along the surface of plaque 128, the water is continually being irradiated and the growth of bacteria is arrested. The inert gas separated is compressed and stored at 170 for recirculation.

In the design of an irradiation station, steps are taken to minimize the amount of radioactive material that has been required, since its cost constitutes a significant part of the cost of converting wood into a wood-plastic composite. It is therefore important to have as little space as possible between the plaque surface containing the radioactive material and the canister surface where radiation is absorbed by the surrounding fluid necessary for biological protection.

Figure 8:
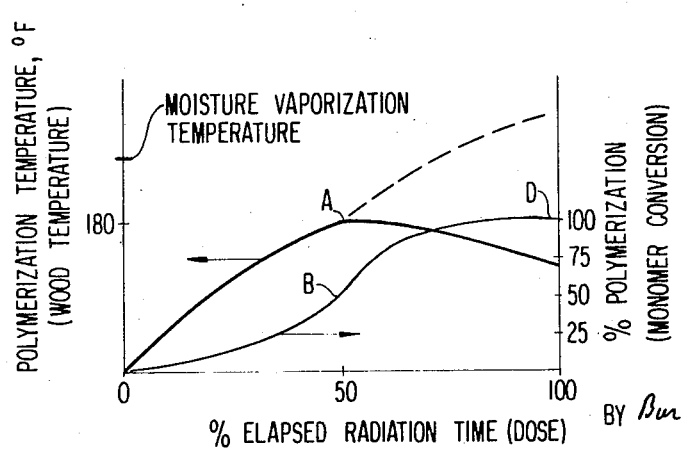
FIG. 8 is a graph of percent polymerization and polymerization or wood temperature versus elapsed radiation times or dose.

Referring now to FIG. 8, the initial canister 10 may be irradiated until the temperature of the wood reaches about 180° to 200°F. (point A). This point represents a condition where only partial, such for example, as approximately 40 to 60 percent polymerization or conversion of the monomer has been effected (point B). When the canister 10 is moved away from the plaque 128, the temperature of the wood within canister 10 drops, e.g., as shown on the graph. At the reduced intensity of irradiation, complete polymerization of the monomer is effected without raising the temperature of the wood therein to the moisture vaporization temperature (point D). The term "moisture vaporization temperature" is used herein to mean that temperature at which the moisture in liquid form in the wood is converted to its vapor state. This temperature varies according to the pressure within the canister, but is usually below 212°F. The exact moisture vaporization temperature at a particular canister pressure may be determined from a phase diagram for water as is shown in Barrow's *Physical Chemistry*, McGraw-Hill Book Co., Inc., New York, 1961, page 457. When moisture in the wood vaporizes during the conversion process, degradation of the wood occurs. Discoloration, distortion and bending are undesirable results which frequently occur. If a laminated material, such as plywood, is being converted, delamination occurs.

The total amount of time that the canister 10 remains immersed in the tank to be exposed to the radiation to cause complete polymerization may be on the order of 6 to 30 hours, and more typically 8 to 15 hours. Maximum utilization of the radiation source with a particular type of wood and monomer amounts to between about 10 and 15 square feet of 5/16 inch thick wood-plastic per Curie per year. With the procedures to be next described, it is possible to nearly double this capacity of the irradiation station.

Figure 7:
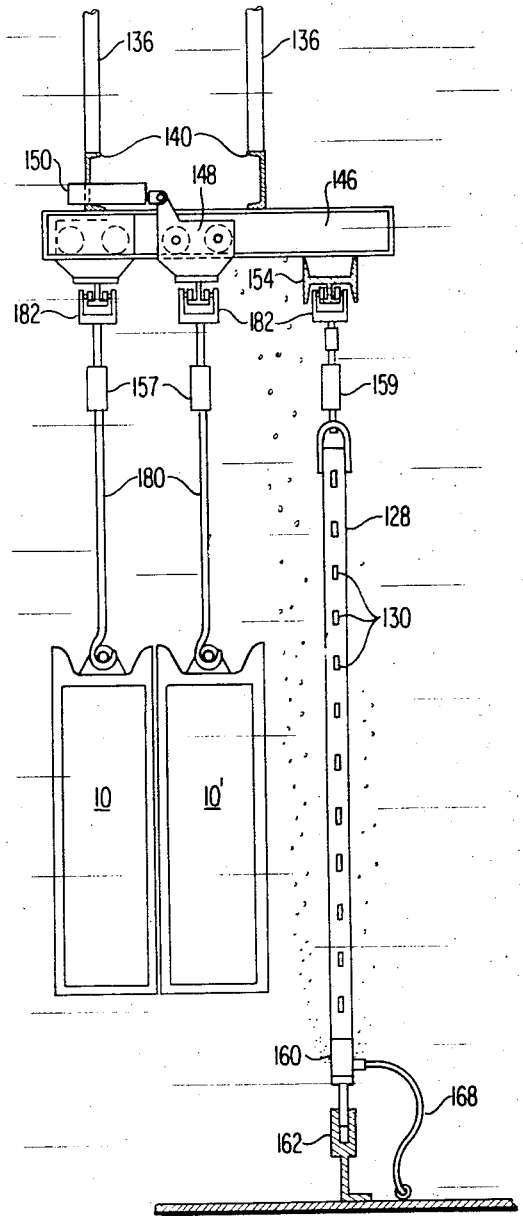
FIG. 7 is a side view illustrating the location of the radiation source and two canisters loaded with plastic impregnated wood and the presence of gas bubbles in the water to improve the effectiveness of the irradiation.

It has been found that with a canister having a thickness of approximately 12 inches, approximately 5 to 10 percent of the radiation passes completely through the canister. It has further been discovered that this reduced amount of radiation is sufficient to continue the polymerization process after it has reached an intermediate rate which is present at about the time the internal temperature reaches approximately 180°F, as illustrated in FIG. 8. When this point is reached, it thus becomes possible to insert a newly loaded canister 10' between the radiation source and the canister 10 where polymerization has been partially completed, as illustrated in FIG. 7, and to use the 5 to 10 percent radiation level passing through the canister 10' nearest the radiation source to continue the polymerization process in the canister 10 where partial polymerization has already occurred. By the time the temperature in the newly loaded canister 10' has reached the desired maximum high temperature level and is ready to be moved back from the radiation source, polymerization in the first canister 10 has been completed and it can then be removed from the irradiation station as a further newly loaded canister 10' is moved into position adjacent the radiation source. As a consequence, the amount of wood which can be converted into a wood-plastic composite with a given amount of radioactive material is substantially doubled as compared with the prior procedures.

Still referring to FIG. 7, and in accordance with the preferred embodiment of the present invention, the canisters 10 and 10' are of substantially identical construction and dimensions, and are positioned immediately adjacent each other. Thus, substantially all of the radiation received by the rear canister 10 has already passed through the forward canister 10' which is placed between canister 10 and the source plaque 128. In operation, the canister 10 is first placed in the position occupied by canister 10'. The impregnated wood in the canister 10 is then irradiated through the walls of the canister by an amount sufficient to effect partial polymerization of the monomer without raising the temperature of the wood to the vaporization temperature of moisture within the wood. The temperature of the wood may be determined by use of a thermocouple (not shown) or upon a prearranged schedule derived from empirical data. During the partial polymerization, the canister 10 is rotated so as to present opposite sides thereof in radiation receiving proximity of the source prior to placing the second canister 10' between the first canister 10 and the source 128.

After the uniform partial polymerization of the monomer in canister 10, the second canister 10' is then placed between the first canister 10 and the radiation source 128 whereby substantially only radiation passing through the second canister effects complete polymerization of the monomer in the first canister 10. Polymerization may thus be completed without raising the temperature of the wood therein as high as the moisture vaporization temperature.

Figure 9:
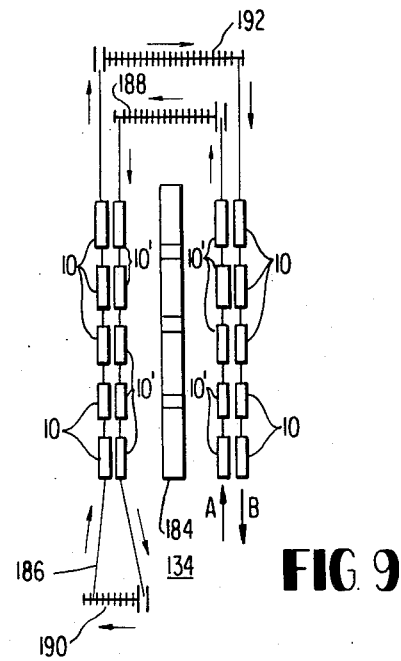
FIG. 9 is a top plan view in schematic of an irradiation station utilizing a series of immediately adjacent canisters.

Referring now to FIG. 9, a top plan view of another embodiment of an irradiation station is shown schematically. In this embodiment, the radiation source is illustrated diagrammatically by plaque 184. Twenty canisters 10 and 10' are illustrated as being in four groups. Each group consists of a series of immediately adjacent canisters. In the embodiment illustrated, five canisters are shown in each group, and the horizontal length of the radiation plaque 184 should thus be at least 20 feet long where 4 foot canisters are used. The canisters are preferably spaced as close together as is practicable to make maximum utilization of the radiation emanating from source 184.

The total irradiation time may be in the range of 8 to 15 hours. During the first half of this time, the canister is in one or more of the positions 10' adjacent the radiation plaque 184, whereas during the last half of the time, the canister is in one or more of the remote positions 10.

Assuming that it requires approximately 4 hours for the internal temperature in the canisters 10' to reach the maximum desired temperature, the canisters 10' on the right side of source 184 desirably should be moved to the left side of source 184 in such way as to place the opposite side wall adjacent the radiation source at the end of about 2 hours to equalize the amount of radiation received by the plastic composite materials in the canister.

At the end of the second two-hour period, all of the canisters 10' are moved to positions indicated at 10, and new canisters are located at the positions indicated by 10'. It has been found that it is not essential, for purposes of equalizing the radiation, to rotate canisters at the outer positions at the end of the 2-hour period, but instead those canisters may be left in place and polymerization will be substantially completed in about 4 hours, or when the temperature in canisters 10' reaches the maximum desired level which is lower than that which causes undesirable effects due to moisture vaporization.

As is shown schematically in FIG. 9, the canisters 10' and 10 may be installed in a conveyor system which transports them along a path indicated by the arrows. New canisters are inserted at point A and canisters having completed the radiation cycle are removed at B. Any suitable arrangement, such as a threaded horizontal transfer unit 188, may be used to move a canister from the first side of plaque 184 to the opposite side, without turning the canister whereby the opposite canister wall faces radiation plaque 184. A second horizontal transfer unit 190 is provided to move the canister to the outer track at 186. And a third horizontal transfer unit 192 is provided to place the canisters in line with the removal station at B.

The conveyor system, if containing groups of canisters as illustrated may be moved intermittently at the appropriate time intervals of, for example, 2 hours. Alternatively, the conveyor system may operate continuously at a slow speed and the canisters form a continuous train which follows the path indicated by the arrows. The exposure time may be controlled by varying the speed of the conveyor system.

In either the intermittently or continuously operated systems, the canisters move while submerged under water about the radiation source 184 along a path, first to receive direct radiation from the plaque 184, and then around the plaque along a second path to unloading point B where the canisters are raised up and removed from the pool 134.

Figure 10:
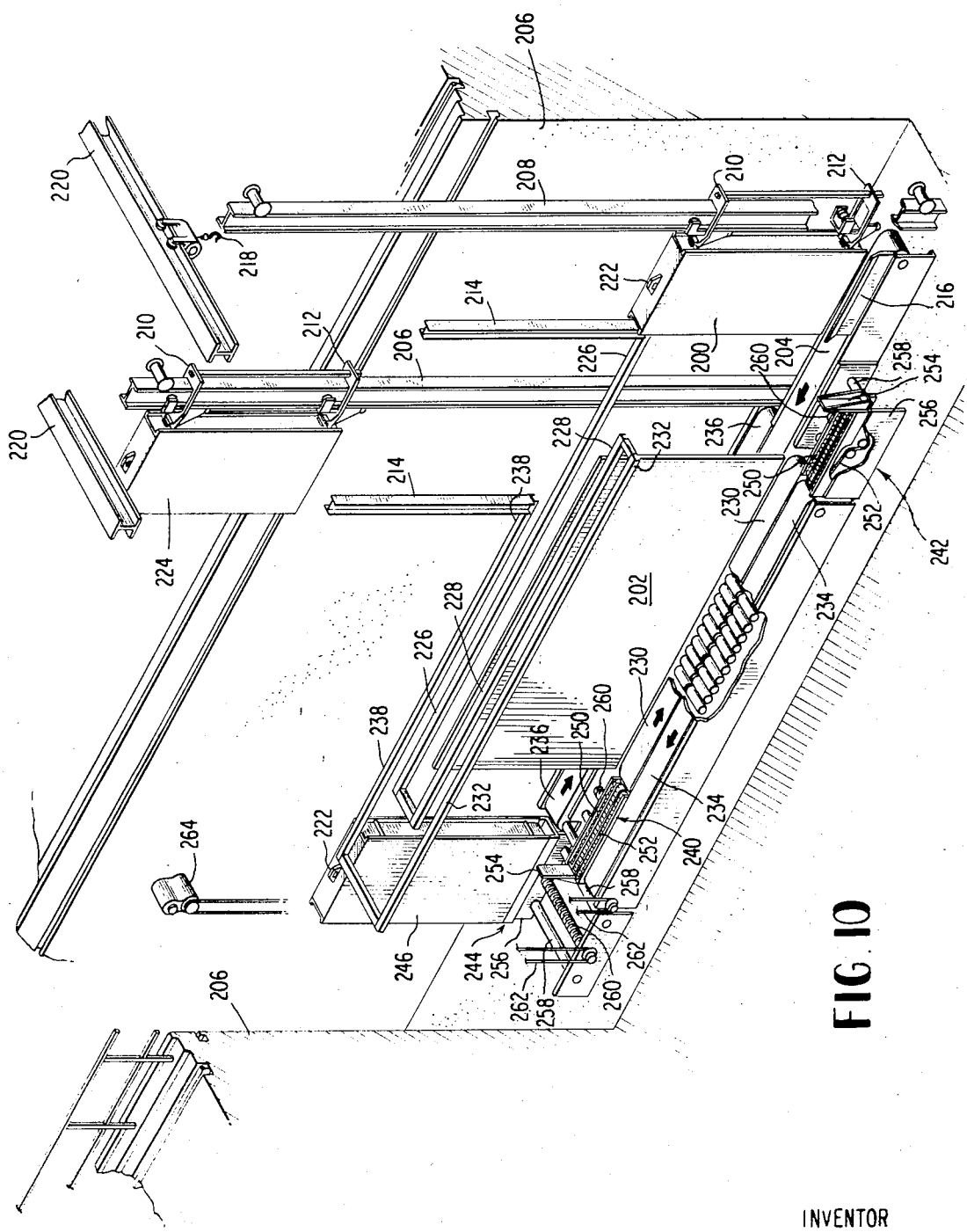
FIG. 10 is a three-dimensional layout view of a canister transport system capable of providing the enhanced efficiency of use of the radiation plaque in accordance with the invention.

Referring now to FIG. 10, a novel transport system is illustrated which represents one way of carrying out the transport of the canisters as described in connection with FIG. 9. FIG. 10 is a three-dimensional layout showing a first canister 200 which is ready for movement into the vicinity of radiation plaque 202 along a moving belt 204 in the direction of arrow A. Canister 200 has been lowered into water or other radiation absorbing fluid contained by a tank having walls, as illustrated at 206. An elevator mechanism including a support beam 208 and canister holding members 210 and 212 at the upper and lower ends of canister 200, is provided to lower the canister onto belt 204. Beam 214 is an orienting beam used to help locate canister 200 between guide plates 216 as it is lowered onto moving belt 204. Canister 200 may be transported to the location of the elevator support beam 208 by an overhead trolley support beam 220 which carries a trolley having a hook 218 that can engage an eye in a plate 222. After the canister is lowered completely onto belt 204, the canister holding members 210 and 212 are lowered sufficiently to become disengaged from the mating bolts or other structures on the canister that are engaged by members 210 and 212.

A similar elevator structure may be used to lift the canister, after the radiation cycle has been completed, to the position illustrated by canister 224. Parts comprising the elevator mechanism for raising, which are similar to parts in the elevator mechanism for lowering, have been given the same reference numerals, and no further description is believed necessary here.

Once canister 200 is lowered so that its bottom edge rests on belt 204, the belt moves the canister so that plate 222 at the top of the canister fits into the channel provided by the horizontal stabilizing beam 226. A similar horizontal stabilizing beam 228 is provided over track 230 which moves in the direction of arrow B. Third and fourth similar horizontal stabilizing beams 232 and 236 are provided over tracks 234 and 238 which move in the directions of arrows C and D, respectively.

Three horizontal transfer units 240, 242, and 244 are provided which correspond to those diagrammatically illustrated at 188, 190, and 192 in FIG. 9. Referring to FIG. 10, a canister 246 is illustrated in position on horizontal transfer unit 244 with its upper guide plate 222 in alignment with the channel in horizontal stabilizing beam 238.

Each of the horizontal transfer units comprises a series of rollers 250 with a separate drive chain 252 for moving the canister in one direction against a stop member 254, and after transfer to alternate position, for moving the canister onto the next belt. The rollers 250 are mounted to a frame 256 which in turn is mounted for horizontal movement along fixed guide members 258. The movement of the horizontal transfer units 240, 242, and 244 is controlled by rotation of a threaded member 260 by means of a chain 262 driven by motors 264, only one of which is shown.

In the embodiment illustrated in FIG. 10, canisters lowered onto belt 204 are moved along and as closely as possible to the rear surface of plaque 202 for approximately one-half the period where high intensity radiation is desired. At the end of this time, the canister is advanced onto horizontal transfer unit 240 and immediately transferred onto belt 230 where the canister is moved along and as closely as possible to the front surface of plaque 202.

When it is desired to reduce the intensity of radiation, the canister is moved onto horizontal transfer unit 242 and transferred outwardly from the plaque 202 to be on belt 234. As newly-loaded canisters are moved along by belt 204, the previously loaded canisters are advanced, and ultimately placed on transfer unit 244 and transferred to the position illustrated by canister 246 and then onto belt 236. Whenever it is determined the polymerization is completed, the canister is advanced by belt 236, the elevator structure used to lift the canister to the position illustrated by canister 224.

It is apparent from FIGS. 9 and 10 and the foregoing description that the present invention offers a great improvement in the efficiency of the utilization of the radiation source. Since a plant output is normally limited by the size of the radiation source, the present invention makes it possible to substantially double the output and thereby reduce significantly the unit costs for the plastic composite material.

The term "wood" has been used in the specification and claims in a generic sense to include cellulose materials in general which include wood in lumber and shaped forms, hardboard or particleboard which is a mixture of wood chips and adhesives, paper and paperboard. All of these materials are successfully converted in the process and equipment comprising the invention. In addition, base materials other than wood may be used. For example, bones, coral, leather and preformed concrete shaped in the form of flooring or wall tiles, furniture parts, or the like may, after drying, be subjected to the same process as described in connection with the wood-plastic composite to thus form other plastic composite materials.

Many modifications will appear to those skilled in the art to which this invention pertains. It is therefore to be understood that the scope of the invention is not to be limited to the embodiments disclosed, but is rather to be restricted only by the language of the appended claims and the range of equivalents to be accorded thereto.

What I claim is:

1. An improved process for the production of wood-plastic composite material, which process comprises:
   providing a source of high energy gamma radiation;
   placing a first canister containing wood impregnated with a liquid monomer within radiation receiving proximity to the radiation source;
   irradiating through walls of the canister the impregnated wood in the canister by an amount sufficient to effect partial polymerization of the monomer without raising the temperature of the wood to the vaporization temperature of moisture within the wood; and
   after partial polymerization of the monomer of the first canister, placing a second canister containing wood impregnated with a liquid monomer between said first canister and the radiation source whereby substantially only radiation passing through the second canister effects complete polymerization of the monomer in the first canister without raising the temperature of the wood therein to the moisture vaporization temperature.

2. The process of claim 1 further including rotating the first canister so as to present an opposite side thereof in radiation receiving proximity of the source prior to placing the second canister between the first canister and the source, and wherein the source of high energy gamma radiation is placed in a tank containing a radiation absorbing liquid into which the canisters are immersed for irradiation.

3. The process of claim 2 wherein the first and second canisters are rectangular and comprise two substantially parallel sidewalls each having an area of about 4 feet by 8 feet and a thickness of about 1 foot, and wherein the polymerization is effected by high energy irradiation through said parallel sidewalls, and wherein the radiation source is an elongated flat plaque having radioactive material placed in the form of discontinuous parallel rows extending across the surface of the plaque.

4. The process of claim 3 wherein the radiation absorbing liquid is water, and wherein the first canister is irradiated until the temperature of the wood therein is approximately 180° to 200°F.

5. The process of claim 1 wherein the second canister receives from 1.6 to 100 rads per second from the radiation source and wherein from 5 to 10 percent of the radiation received by the second canister passes through the second canister and is received by the first canister.

6. The process of claim 1 wherein said first canister is in a group comprising a first series of canisters all containing wood impregnated with a liquid monomer and which canisters are all caused to pass along a path within radiation receiving proximity of the radiation source; and wherein said second canister is in another group comprising a second series of canisters all containing wood impregnated with a liquid monomer and which canisters are all caused to pass along a path between the first series of canisters and the radiation source whereby substantially only radiation passing through the second series of canisters is received by the first series of canisters to effect further polymerization of the wood in said first series of canisters without raising the temperature to the moisture vaporization temperature.

7. The process of claim 6 further including rotating the first series of canisters so as to present an opposite side thereof in radiation receiving proximity of the source prior to placing the second canisters between the first canisters and the source, and wherein the source of high energy gamma radiation is placed in a tank containing a radiation absorbing liquid into which the canisters are immersed for irradiation.

8. The process of claim 6 wherein the first and second series of canisters are continuously and uniformly moving about the radiation source.

9. An improved process for the production of wood plastic composite material, which process comprises:
submerging a first canister containing wood impregnated with a liquid monomer into a radiation absorbing liquid;
moving the first canister into radiation receiving proximity to a source of gamma radiation submerged within the radiation absorbing liquid;
irradiating through the walls of the canister the impregnated wood in the canister by an amount sufficient to effect partial polymerization of the monomer without raising the temperature of the wood to the vaporization temperature of moisture within the wood; and
after partial polymerization of the monomer of the first canister, placing a second canister containing wood impregnated with a liquid monomer between the first canister and the radiation source whereby substantially only radiation passing through the second canister effects complete polymerization of the monomer in the first canister without raising the temperature of the wood therein to the moisture vaporization temperature.

10. The process of claim 9 wherein the source of radiation is submerged in a radiation absorbing liquid and including the steps of submerging said canisters into said liquid as they are ready for treatment at the irradiation station and of removing said canisters from said liquid when polymerization of the monomer has been substantially completed.

* * * * *